United States Patent [19]
Kester

[11] 3,817,621
[45] June 18, 1974

[54] RANGE FINDER
[76] Inventor: Charles E. Kester, 6 Fairfield Dr., Fairport, N.Y. 14450
[22] Filed: Apr. 19, 1973
[21] Appl. No.: 352,524

[52] U.S. Cl. ................................ 356/17, 33/125 A
[51] Int. Cl. .............................................. G01c 3/12
[58] Field of Search ............... 356/16, 17, 1, 29, 15, 356/17, 252; 250/237 G; 33/125 A

[56] References Cited
UNITED STATES PATENTS

| | | | |
|---|---|---|---|
| 2,627,779 | 2/1953 | Szelwach | 356/17 |
| 2,694,804 | 11/1954 | Wagner | 356/169 |
| 2,978,949 | 4/1961 | Seeger | 356/17 |
| 2,995,059 | 8/1961 | Oehling | 356/17 |
| 3,658,429 | 4/1972 | Zipin | 33/125 A |

FOREIGN PATENTS OR APPLICATIONS

| | | | |
|---|---|---|---|
| 909,046 | 4/1954 | Germany | 356/17 |
| 1,172,668 | 12/1969 | Great Britain | 33/125 A |

Primary Examiner—Ronald L. Wibert
Assistant Examiner—F. L. Evans
Attorney, Agent, or Firm—Shlesinger, Fitzsimmons & Shlesinger

[57] ABSTRACT

The finder housing contains an eyepiece, and an optical triangulation system in which one of two optical elements is pivotal relative to the other to project two images of a remote object into coincidence at the eyepiece. The adjustable element is carried by a pivotal arm, which is connected by a finely threaded screw to a manually rotatable knob so that several revolutions of the knob are required to swing the arm from one to the other of its limit positions. A measuring tape is connected at opposite ends to the knob and passes around a spaced idler spool for movement by the knob when the latter is rotated to make the images coincide. A graduated surface on the tape is viewable through an opening in the housing to indicate the linear distance of an object from the housing when the images coincide at the eyepiece.

14 Claims, 6 Drawing Figures

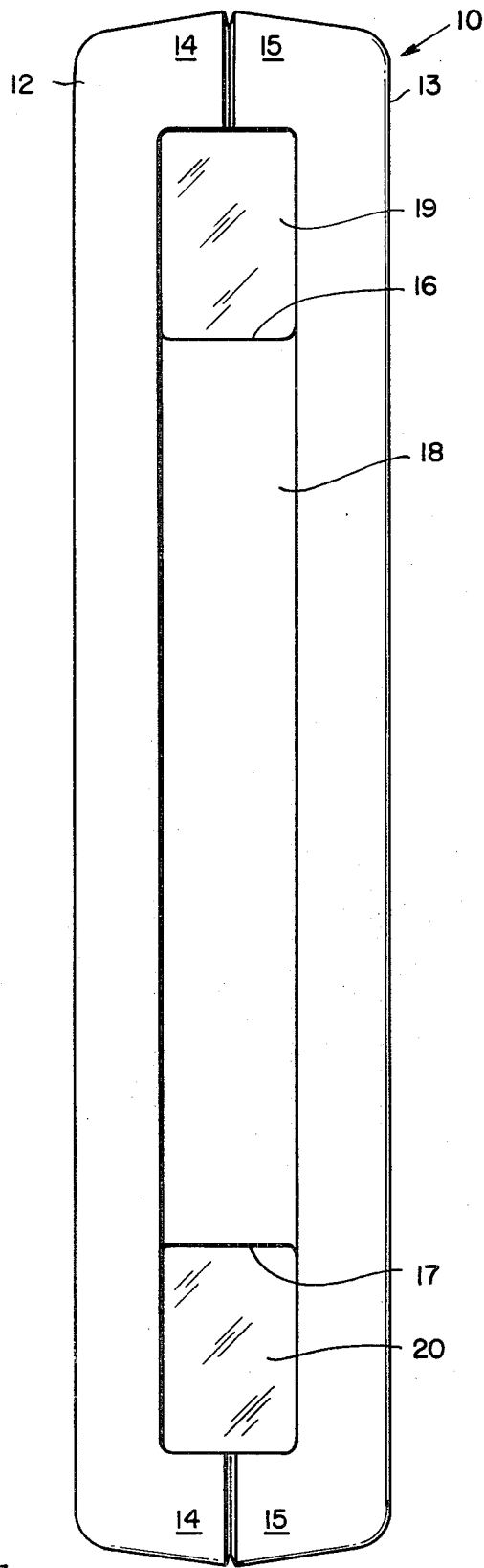
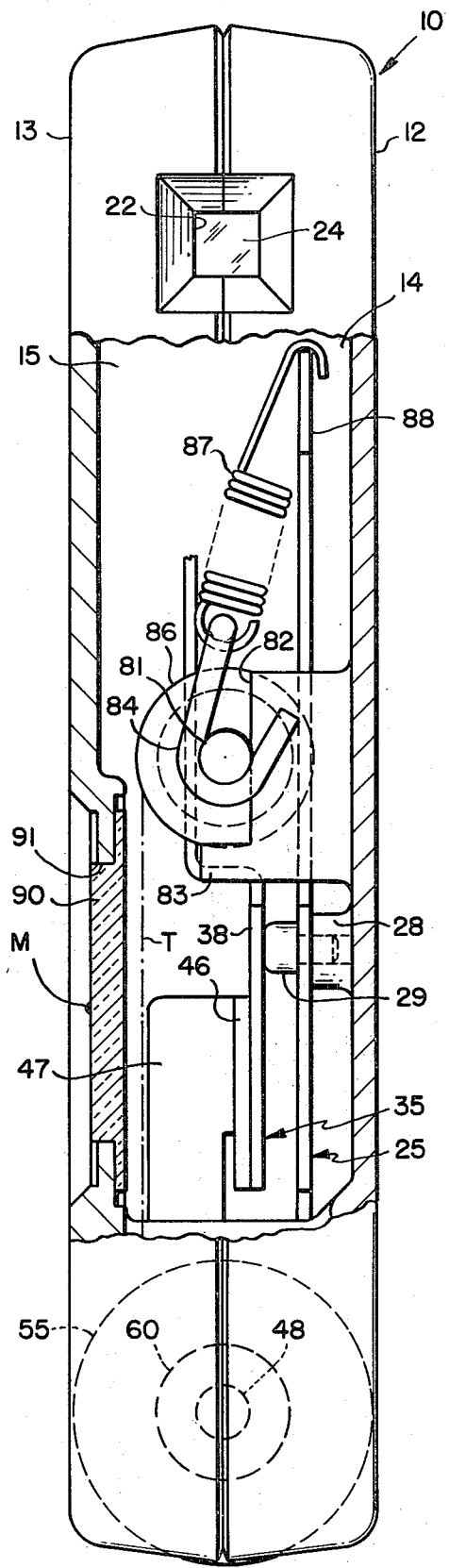
FIG. 1
FIG. 2

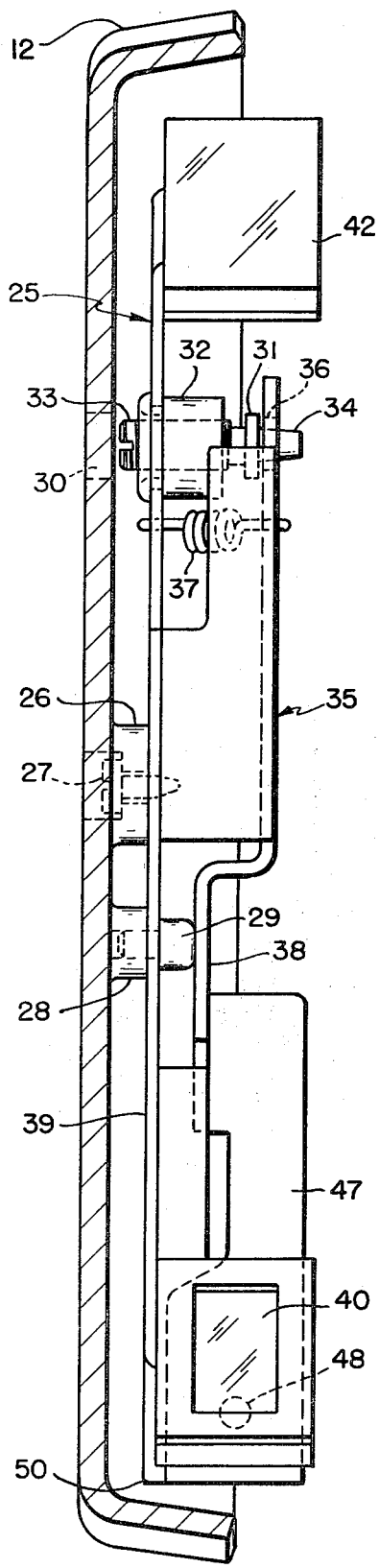
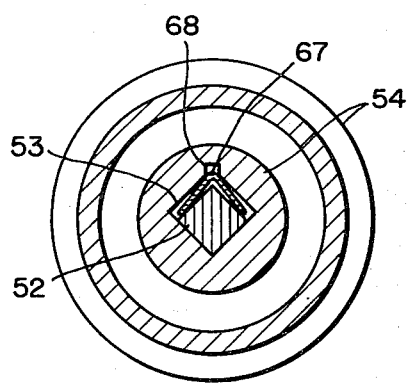
FIG. 5
FIG. 6

RANGE FINDER

This invention relates to range finders, and more particularly to the hand-held variety which utilizes optical triangulation for determining distances.

Conventional range finders of the type described generally utilize a pair of spaced optical elements for projecting two images of a remote object into an eyepiece. One element is then rotated about a pivot between first and second limit positions to cause the observed images to register or coincide with each other at the eyepiece. The two angular limit positions of the adjustable element correspond to the range limits of the instrument, for example to the zero and infinity positions, respectively, of objects relative to the range finder. For an object close to the instrument, the two images thereof will coincide when the adjustable element is in or near one of its limit positions; and for an object extremely remote from the range finder its two images will coincide when the adjustable element is in or near its other limit position. The angular movement of the adjustable element, therefore, can be calibrated to indicate the linear distance between the range finder and the object that produces the coincident images.

A major disadvantage of known range finders of the type described is that the movement of the adjustable optical element usually is transmitted to a rotatable dial indicator, which is graduated to indicate the linear distance of an object from the range finder, and which makes one complete revolution each time the adjustable optical element is swung from one to the other of its limit positions. One way to increase the accuracy of the instrument is to increase the distance between the two optical elements; and another way is to increase the diameter of the graduated dial. As these dimensions increase, however, the instrument becomes correspondingly larger and difficult to handle. Moreover, prior such instruments have been difficult to calibrate for range, and generally do not have a satisfactory mechanism for adjusting for "halving," i.e., for aligning the two viewed images vertically, if necessary.

A primary object of this invention is to increase substantially the accuracy of a range finder of the optical triangulation variety, without appreciably increasing the size of the instrument. To this end it is an object also to obviate the need for using a rotatable indicator dial of type heretofore employed in such instruments.

A further object of this invention is to provide an improved range finder which is easier to calibrate for range than prior such instruments.

Still another object of this invention is to provide novel means for indicating the linear distance of an object from a range finder of the type that utilizes optical triangulation for measuring distances.

A more specific object of this invention is to provide an optical triangulation instrument which utilizes a flexible, calibrated tape for accurately indicating distances to remote objects.

It is an object also of this invention to provide improved means for adjusting for "halving" in the optical system of a range finder of the type described.

Further objects of the invention will be apparent hereinafter from the specification and from the recital of the appended claims, particularly when read in conjunction with the accompanying drawings.

In the drawings:

FIG. 1 is a front elevational view of a range finder made according to one embodiment of this invention;

FIG. 2 is a rear elevational view of this instrument with portions of its housing broken away and shown in section;

FIG. 5 is a fragmentary sectional view taken generally along the line 5—5 in FIG. 3 looking in the direction of the arrows; and FIG. 6 is a sectional view taken along the line 6—6 in FIG. 4 looking in the direction of the arrows.

Figure 3:
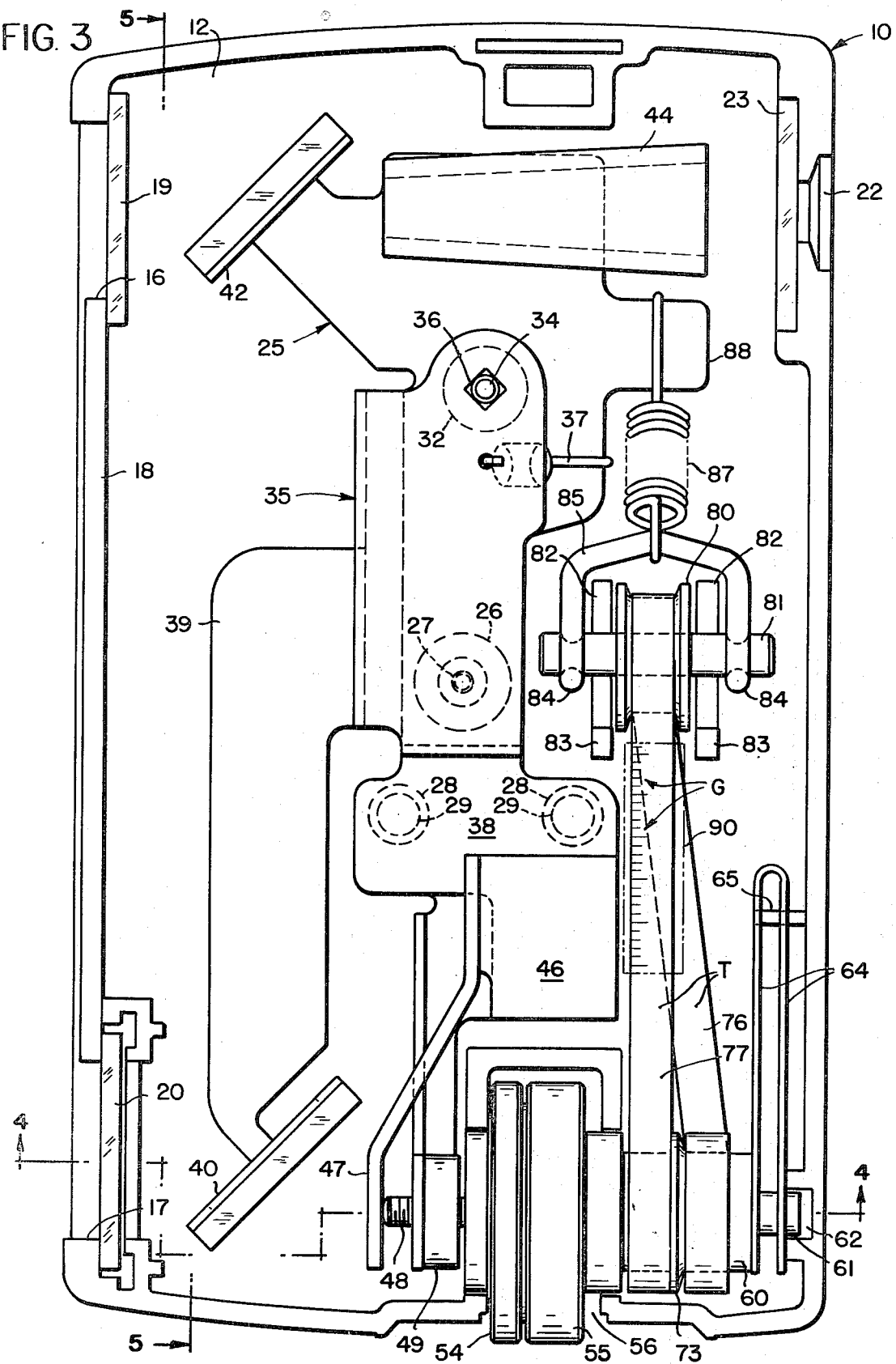
FIG. 3 is a side elevational view of this instrument with one side of its housing removed.
Figure 4:
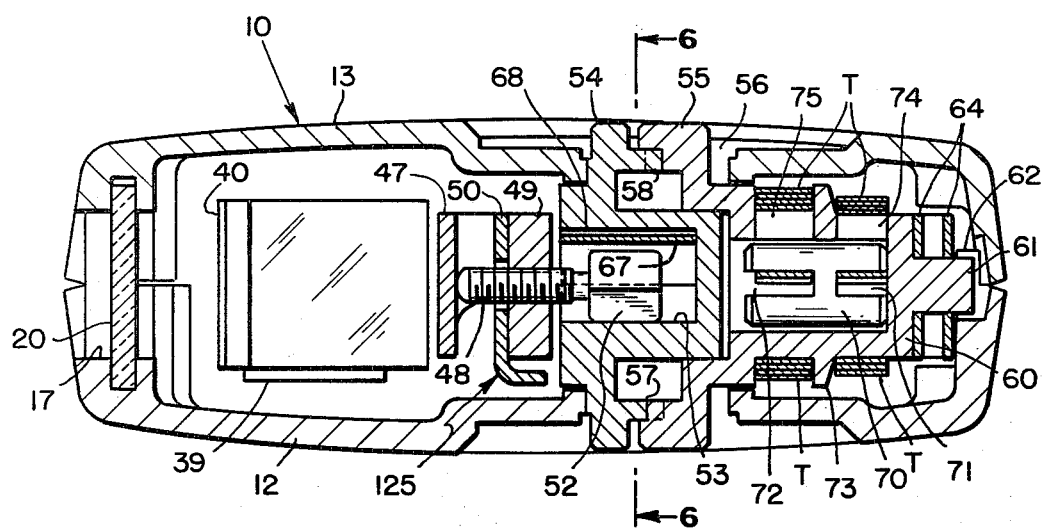
FIG. 4 is a sectional view taken along the line 4—4 in FIG. 3 looking in the direction of the arrows.

Referring now to the drawings by numerals of reference, 10 denotes generally a rigid housing comprising a pair of opposed, centrally recessed side sections 12 and 13, which are generally rectangular in configuration. Around their open ends sections 12 and 13 have integral flanges 14 and 15, respectively, which are secured in abutting relation as shown in FIGS. 1 and 2. Two, rectangular, vertically spaced apertures 16 and 17 (FIGS. 1 and 3) are formed in the front end of housing 10 (its left end as illustrated in FIGS. 3 and 4) at opposite ends of a rib or plate 18, which is secured between recessed portions of the flanges 14 and 15. Transparent windows or plates 19 and 20 are secured in the housing across the inner ends of openings 16 and 17, respectively, to seal these openings but to admit light. In its rear end housing 10 has a rectangular sight opening 22 (FIGS. 2 and 3), which registers with the opening 16 in the front of the housing, and which also is closed at its inner end by a transparent window 23.

Mounted on the inside of section 12 to extend longitudinally of the housing in spaced, parallel relation to section 12 is a generally flat, stationary arm 25 (FIGS. 2 to 5). Intermediate its ends, arm 25 is secured against the inner end of a central, cylindrical boss 26 on section 12 by screw 27 (FIGS. 3 and 5), which threads into the boss 26 and arm 25 from the exterior section 12. Adjacent boss 26 arm 25 is also secured to the inner ends of two other bosses 28 (FIGS. 3 and 5) by the shanks of two, cylindrically-shaped pivot pads 29, which project equi-distantly from the inside surface of arm 25 for a purpose noted hereinafter.

Secured in an opening in arm 25 adjacent the upper end of housing 10 to register with an access opening 30 (FIG. 5) in section 12 is an internally threaded nut 32 (FIGS. 3 and 5). A screw 33, which is adjustably threaded in the bore of nut 32, has a kerfed end facing the opening 30, and a conically shaped inner end 34 which projects into the housing, and which is separated from the threaded portion of the screw by an external shoulder 31.

Mounted by a rectangular opening 36 in its upper end (FIGS. 3 and 5) to pivot about the conical end 34 of screw 33 is an elongate, adjustable range arm 35. Arm 35 is held resiliently over the conical end 34 of screw 33, and against the shoulder 31, by a tension spring 37 (FIGS. 3 and 5), which is fixed at one end to arm 35 and at its opposite end to arm 25 adjacent the nut 32. The sides of opening 36 engage the conical surface 34 on screw 33 so that arm 35 is pivotal about the screw in a transverse plane that is adjustable as noted hereinafter.

Intermediate its ends arm 35 has a central offset portion 38 (FIGS. 2, 3 and 5), which rests upon the inner ends of the pivot pads 29; and at one side thereof arm 35 has a laterally offset projection 39 (FIGS. 3 to 5), which extends downwardly in the housing 10 adjacent the front end thereof. Fastened to the free end of the projection 39 on arm 35 to be supported thereby adjacent the inner end of window 20 is an inclined mirror 40. The face of mirror 40 is inclined to window 20, and is disposed in spaced, parallel, confronting relation to an inclined beam splitter 42, which is fastened at the opposite end of housing 10 on the stationary arm 25 to project laterally therefrom into registry with the other window 19 in the front of the housing. The beam splitter 42 is positioned diagonally between the window 19 and one end of a truncated view finding tube 44, which is mounted on arm 25 between the beam splitter 42 and the sight window 23.

Spot welded or otherwise secured on the offset portion 38 of the pivotal arm 35 is a flat plate 46 (FIGS. 2 and 3), which has an integral, laterally offset operating arm 47 that projects downwardly behind the mirror 40 as shown in FIG. 3. The free end of arm 47 is held resiliently against one end of an adjustable range screw 48 (FIGS. 2 to 5) that is threaded intermediate its end in the bore of a stationary nut 49, which is fastened to the back of a flange 50 that projects from arm 25 behind the operating arm 47. At its opposite end the screw 48 has an enlarged, rectangular head 52 (FIGS. 4 and 6), which is axially slidable in a rectangular bore 53 that is formed in the hub of a circular member 54, which forms one section of a two piece, circular range knob that is rotatable in a recess 56 in the lower end of housing 10 adjacent arm 47.

The hub of member 54 projects coaxially and slidably into a counterbore that is formed in one end of another circular member 55 (FIGS. 2 to 4), which forms the other section of the two piece range knob. Section 55 is releasably coupled to section 54 by a plurality of angularly spaced teeth 57 (FIG. 4), which are formed on an internal, circumferential shoulder on member 55 to mesh with a like plurality of teeth 58 formed on the confronting end of member 54. Intermediate its ends member 55 has a cylindrical hub section 60 for supporting a measuring tape T as noted hereinafter. A stub shaft 61, which projects coaxially from the end of hub 60, extends slidably through registering openings in the two arms of a U-shaped leaf spring 64, and into a circular recess 62 in the back of housing 10 to support sections 54 and 55 for rotation coaxially of the screw 48. Spring 64 is secured adjacent its closed end by a bracket 65 to the inside of the housing 10; and its legs urge member 55 axially and resiliently toward member 54 normally to maintain the clutch teeth 57 and 58 drivingly engaged, whereby the two sections 54 and 55 normally rotate as one.

A smaller, U-shaped leaf spring 67 (FIGS. 4 and 6) is mounted in the rectangular bore 53 of member 54 with its closed end seated in an axially extending groove 68 formed in one corner of bore 53 and with the two legs of the spring embracing, adjacent, intersecting sides of head 52 resiliently to hold the head slidably against the opposite side of bore 53. This prevents any undesirable backlash or loss of motion in the head 52 and consequently the screw 48, when the range knob 54, 55 is rotated as noted hereinafter.

Rotatably mounted in the bore of the hub 60 on member 55 is a tape locking pin 70 (FIG. 4), opposite ends of which are slotted as at 71 and 72. Intermediate its ends hub 60 has an external, circumferential shoulder 73; and at opposite sides of this shoulder it contains two slots 74 and 75, which are registrable with the slots 71 and 72 in pin 70, when the latter is rotated into its tape releasing position.

Extending at opposite ends through the slots 74 and 75 in hub 60 and into the slots 71 and 72, respectively, in the locking pin 70, is an elongate, flexible measuring tape T (FIGS. 2 to 4). The tape is secured to pin 70, before assembly of the range knob, by rotating pin 70 to register slots 71 and 72 with the slots 74 and 75 in the hub, inserting opposite ends of the tape T through these registering slots, and then rotating the pin 90° so that opposite ends of the tape are frictionally secured between the pin 70 and the bore wall of hub 60. As shown in FIGS. 3 and 4, one end of the tape is wound on the hub 60 at the right of shoulder 73 and passes beneath the hub to form a lower run 76; and the other end of the tape is wound on hub 60 at the left side of shoulder 73 and passes over the top of the hub to form an upper run 77.

Intermediate its ends tape T passes around the hub of a rotatable idler spool 80 (FIGS. 2 and 3), which is mounted on a shaft or pin 81 to rotate about an axis parallel to the axis of rotation of knob 54, 55. Opposite ends of pin 81 are mounted for sliding movement on a pair of spaced bearing blocks 82 that are fastened to the inside of section 12 adjacent the pivotal end of arm 35. A pair of dogs or stop lugs 83 project from the faces of the blocks 82 to limit the movement of pin 81 toward the range knob. Opposite ends of shaft 81 are also releasably seated in the hooked-shaped ends 84 of a yoke 85, which is connected by a tension spring 87 to a lug 88 that projects from one side of stationary arm 25. Spring 87 draws the yoke 85 resiliently away from the hub 60, thereby to maintain tension in the upper and lower runs 76 and 77 of the tape T.

The bearings 82 and the yoke 85 are positioned so that spool 80 registers with the portion of the hub 60 over which the upper run 77 of the tape travels, so that upon rotation of knob 54, 55, the upper run 77 will travel in a straight line beneath an elongate, transparent viewing window 90 (FIG. 2 and broken lines in FIG. 3), which is secured in an opening 91 in the housing section 13 to enable an operator to observe the graduated face of the tape. The lower run 76, however, is therefore inclined slightly to the axis of hub 60 and is guided on and off the right end thereof by rib 73.

In use, an operator views a remote object through the opening 22 and window 23, so that two images of the object are projected through the front windows 19 and 20 onto the beam splitter 42 and the mirror 40, respectively. Part of the light from the image entering window 19 (for example, yellow light) passes through the beam splitter 42 and the view finding tube 44 to the eye of the operator, thereby providing one image of the object. Light entering the window 20 is reflected by mirror 40 onto the side of the beam splitter 42 remote from window 19, whereby part only of this light (again, for example, yellow light) is reflected by the beam splitter 42 through the tube 44 to the eye of the observer to form a a second image of the object. If the two observed images are not coincident, i.e., they are laterally spaced from one another-the operator then rotates the range knob 54, 55 manually in one direction or the other until the two images coincide.

Any rotation imparted to the knob 54, 55 will be imparted also to hub 60, and through the axially slidable head 52 to the screw 48, which therefore advances toward, or retracts from, the spring-loaded operating arm 47, depending upon the direction of the rotation of the range knob. The screw 48 is provided with very fine threads, so that relatively large angular movements of the range knob impart only slight axial movements to the screw 48, and hence correspondingly slight angular movements to member 47 and its attached arm 35 about the axis of the conical pivot 34. This same angular movement is imparted to the mirror 40 on arm 35 to enable the two viewed images to be moved into coincidence in known manner.

If the two viewed images are out of vertical alignment with one another, the operator can adjust the instrument for "halving," by inserting a screw-driver through the opening 30 in section 12 and rotating screw 33 to shift its conical pivot point 34 axially. This causes movable arm 35 to pivot about the fulcrum represented by the heads of the two pivot pads 29, the center lines of which lie in a plane that extends transverse to arm 35. This causes the mirror 40 to be shifted in a plane parallel to the axis of the pivot pin 34, and consequently will shift one of the observed images vertically relative to the other until they are in vertical alignment with each other.

When the hub 60 of the range knob is rotated in one direction, the tape T is unwound, for example, from the portion of the hub at the left side of rib 73 (as illustrated in FIG. 3), and is simultaneously wound up on the portion of the hub located at the right side of rib 73. Conversely, when the hub 60 is rotated in the opposite direction, the tape unwinds from the right end of the hub 60 (FIG. 3) and winds up onto the left end thereof. Regardless of the direction in which the tape is caused to travel, whenever one end or the other thereof has been completely unwound from the hub, further rotation of the knob 54, 55 will cause both ends of the tape to travel in the same direction (over the bottom or top of the hub 60 as illustrated in FIG. 3), so that the tape will commence to draw the spool 80 forwardly on the blocks 82 toward the stops 83, and against the resistance of spring 87. When the pin 81 engages stops 83, further rotation of the range knob is prevented, thereby indicating that the tape T has been completely wound on one end or the other of the hub 60.

Since the operative diameter of the hub 60 about which the tape T must travel increases or decreases as the tape is wound up onto, or wound off from, one end or the other of the hub, the tape will not travel at a constant rate when the range knob is rotated. For example, when substantially all of the tape is wound on the left side of the hub 60 (FIG. 3), further rotation of the knob 54, 55 in counterclockwise direction (FIG. 2) will tend to wind more tape T onto the left end of the hub 60 at a greater rate than the tape is unwound from the right end of the hub, where the overall diameter of the wound tape now is substantially less than that at the left end of the hub. The spring 87 permits the yoke-mounted spool 80 to shift on the blocks 82 toward and away from the tape hub 60 to compensate for this variation, while at the same time maintaining the upper and lower runs of the tape under constant tension.

One side of the tape T (the side of the upper run 77 that faces the observation window 90) is provided with a plurality of spaced graduations G (FIG. 3) that are observable through the window 90, and which are registrable selectively with a fixed reference mark M (FIG. 2) on the window 90 or adjacent thereto. The tape is calibrated so that the space between adjacent graduations G will represent a predetermined linear distance of an object from the housing 10 when the observed images of the object coincide. The two piece range knob permits the tape to be adjusted relative to the movable arm 35 by shifting, for example, the section 55 axially away from section 54, and against the resistance of the clutch spring 64, to enable the section 55 to be rotated relative to section 54. This enables the tape T to be adjusted on the hub 60 without imparting any rotation to the range screw 48. Following such adjustment, the section 55 is released to permit its teeth 57 to reengage resiliently with the teeth 58 on section 54 under the tension of spring 64.

From the foregoing it will be apparent that the instant invention provides relatively simple and inexpensive means for substantially increasing the accuracy of an optical triangulation instrument or range finder of the type described. In view of the large diameter of the tape hub 60, as compared to that of the range screw 48, a relatively large degree of linear movement is imparted to tape T each time relatively slight angular motion is imparted to arm 35 by the range screw 48 and knob 54, 55. The tape T, therefore, can be calibrated to provide a larger scale than was heretofore possible with range finders of the type which employ a rotatable dial indicator capable of making only one revolution in response to the pivotal movement of the associated optical element from one to the other of its limit positions.

Further, by passing the measuring tape around the floating idler spool 80, it is possible selectively to wind a plurality of turns of the tape around one or the other end of the hub 60, so that an extremely long tape may be used to increase accuracy and range, if desired. Also, by providing a two piece range knob 54, 55 the range calibration of the instrument is simplified, and can be performed readily even after the instrument has been completely assembled. Furthermore, by mounting the pivotal range arm 35 for both angular and transverse movement relative to the tapered pivot pin 34, it is a simple matter to adjust the instrument for "halving," merely by rotating the screw 33, which is readily accessible from the exterior of the housing.

Still another advantage of this instrument is that the view finding tube interposed between the beam splitter 42 and the eyepiece 22 minimizes any cross field error, which might otherwise result from moving the housing 10 laterally while attempting to sight an object from the housing.

While the invention has been described in detail in connection with a preferred embodiment thereof, it is apparent that it is capable of further modification, and that this application is intended to cover any embodiments that come within the scope of the invention or the recital of the appended claims.

Having thus described my invention, what I claim is:

1. In a range finder having an eyepiece, an optical triangulation system including a pair of spaced optical elements for projecting two images of a remote object into said eyepiece, means mounting one of said elements for pivotal movement about a first axis to position said images in coincidence at said eyepiece, a first member rotatable manually in opposite directions about a second axis, and means connecting said first member to said one element to pivot said one element in opposite direction, respectively, about said first axis, when said first member is rotated in opposite directions, respectively, about said second axis, the improvement comprising a second member mounted to rotate in spaced, parallel relation to said first member about a third axis spaced from and extending parallel to said second axis, and a flexible measuring tape mounted to travel non-linearly with rotation of said first member in opposite directions, respectively, between said members, and past a stationary reference mark, when said first member is rotated in opposite directions, respectively, about said second axis, said tape having thereon a graduated surface calibrated in proportion to the angular movement of said one element and readable against said reference mark to indicate the linear distance from said eyepiece to said remote object, when the two images thereof are coincident at said eyepiece.

2. The range finder as defined in claim 1, wherein each of said members has thereon a cylindrical surface disposed coaxially of the axis of rotation of the member, said tape is secured at opposite ends thereof to the cylindrical surface on one of said members and extends intermediate its ends from diametrally opposite sides of said one member in the form of a loop which passes around the cylindrical surface on the other of said members, and said one member is operative to wind up a portion of said tape onto its cylindrical surface adjacent one end thereof while simultaneously unwinding a portion of said tape from its cylindrical surface adjacent the opposite end thereof, when rotated in one direction, and vice versa.

3. The range finder as defined in claim 2, including means mounting said second member for limited translational movement toward and away from said first member in a direction radially of the cylindrical surface on said first member, and resilient means connected to said second member to resist movement thereof toward said first member.

4. The range finder as defined in claim 2, wherein said mounting means comprises an arm mounted adjacent one end to pivot about said first axis and attached adjacent its opposite end to said one optical element adjustably to support said one element in operative registry with the other of said elements, and said connecting means comprises screw connected to said first member for reciprocation thereby along said second axis transverse to said first axis, and operatively connected to said arm to pivot said arm from a first to a second limit position upon rotation of said first member a predetermined plurality of revolutions in one direction, and vice versa.

5. The range finder as defined in claim 4, including releasable coupling means interposed between said screw and said first member selectively to disconnect said screw from said first member to enable rotation of said first member and adjustment of said tape relative to said reference mark without imparting motion to said arm.

6. The range finder as defined in claim 4, including means supporting said arm intermediate its ends for pivotal movement about a fourth axis transverse to said first axis, and an adjustable pivot pin projecting into an opening in said one end of said arm to guide said arm for pivotal movement selectively about said first and fourth axes, respectively.

7. The range finder as defined in claim 6, wherein said opening in said one end of said arm is rectangular, and said pivot pin has a truncated conical end projecting into said opening with its conical surface engaged with the intersecting sides of said opening to allow said arm to pivot selectively about said first and fourth axes, respectively.

8. A range finder including a housing having an eyepiece, a pair of spaced optical elements in said housing for projecting into said eyepiece two images of an object spaced from said housing, one of said elements being mounted for pivotal movement relative to the other element about a first axis to effect coincidence of said images at said eyepiece, a knob rotatable on said housing about a second axis for moving said one element selectively in opposite directions about said first axis, to cause said images to coincide at said eyepiece, and the improvement comprising an elongate, flexible measuring tape mounted in said housing, and means connecting said tape to said knob for movement thereby in opposite directions lengthwise past a stationary reference mark on said housing, and at rates which increase and decrease, respectively, with each revolution of said knob, upon rotation of said knob in opposite directions, respectively, about said second axis, said tape having thereon a plurality of longitudinally spaced graduations readable from the exterior of said housing against said reference mark to indicate the linear distance from said housing to said object, when the two images of the object coincide at said eyepiece.

9. A range finder as defined in claim 8, including means operative during rotation of said knob to move said tape at a rate greater than the rate at which said one element is swung about said first axis.

10. A range finder as defined in claim 8, including means securing opposite ends of said tape to a cylindrical surface disposed on said knob coaxially of said second axis, and means for guiding a portion of said tape intermediate its ends for travel around a third axis spaced from and parallel to said second axis, said knob being operative upon rotation about said second axis to wind up one end of said tape onto part of said cylindrical surface, while simultaneously unwinding the opposite end of said tape from another portion of said surface.

11. A range finder as defined in claim 10, wherein said guiding means comprises a cylindrical member mounted to rotate about said third axis in spaced, parallel relation to said cylindrical surface on said knob, said tape extending intermediate its ends between said knob and said member in the form of a loop which travels around the outside of said member, upon rotation of said knob, means mounting said member for limited translation movement toward and away from said knob radially of said cylindrical surface thereon, and resilient means between said member and said housing resiliently to resist movement of said member toward said knob.

12. A range finder as defined in claim 8, wherein said knob comprises a pair of members mounted for rotation about said second axis, one of said members being connected to said tape, and the other of said members being connected to said one element, said one member has thereon a transverse clutch face and is movable axially into and out of an operative position in which said face is drivingly engaged with a cooperating clutch face on said other member, resilient means urges said one member into its operation position, whereby said members normally are rotatable in unison about said second axis, and said one member is movable manually away from said other member to disengage said clutch faces to permit rotation of said one member independently of said other member, thereby to move said tape independently of said one element while said clutch faces are disengaged.

13. A range finder as defined in claim 8, including a first arm fixed in said housing and attached adjacent one end to said other element to support said other element in a stationary position between said eyepiece and a first opening in one side of said housing, a pivot pin adjustably mounted in said housing coaxially of said first axis, a second arm pivoted adjacent one end thereof in said housing on said pivot pin for swinging movement in a first plane about said first axis, and attached adjacent its opposite end to said one element movably to support said one element adjacent a second opening in said one side of said housing, and in operative relation to said other element, means in said housing engaged with said second arm intermediate its ends to support said second arm for pivotal movement about a further axis spaced from, and extending transverse to said first axis, and means adjustable from the exterior of said housing to shift said pivot pin axially of said first axis, thereby to pivot said second arm about said further axis and to swing said one element in a second plane transverse to said first plane to adjust the images at said eyepiece for halving.

14. A range finder as defined in claim 13, including an adjusting screw rotatably mounted intermediate its ends in said stationary arm for rotation coaxially of said second axis, and engaged at one end with said second arm adjacent said opposite end thereof, and means coupling the opposite end of said screw to said knob for rotation thereby, and operative respectively to advance and retract said screw relative to said second arm upon rotation of said knob in opposite directions, respectively, about said second axis, thereby to bring about the coincidence of said images at said eyepiece through rotation of said knob.

* * * * *